United States Patent [19]

Sankpal et al.

[11] Patent Number: 5,188,005
[45] Date of Patent: Feb. 23, 1993

[54] METHOD AND SYSTEM FOR IMPROVING SMOOTHNESS OF SHIFTS IN AN AUTOMATIC TRANSMISSION

[75] Inventors: Bak G. Sankpal, Rochester; John F. Carnago, Trenton, both of Mich.

[73] Assignee: Ford Motor Company, Dearborn, Mich.

[21] Appl. No.: 582,444

[22] Filed: Sep. 14, 1990

[51] Int. Cl.⁵ .................. B60K 41/02; B60K 41/06
[52] U.S. Cl. .................................. 74/866; 74/851; 74/858; 74/867; 192/109 F; 364/424.1
[58] Field of Search ............... 74/866, 867; 192/109 F; 364/424.1

[56] References Cited

U.S. PATENT DOCUMENTS

| | | | |
|---|---|---|---|
| 3,822,771 | 7/1974 | Audiffred et al. | 192/109 F X |
| 3,991,865 | 11/1976 | Komatsu | 192/109 F |
| 4,633,738 | 1/1987 | Timte | 74/869 |
| 4,665,770 | 5/1987 | Van Selous | 74/888 |
| 4,711,329 | 12/1987 | Hasegawa et al. | 192/109 F X |
| 4,744,031 | 5/1988 | Takeda et al. | 74/866 X |
| 4,748,870 | 6/1988 | Sugino et al. | 74/866 |
| 4,790,418 | 12/1988 | Brown et al. | 192/32 |
| 4,792,902 | 12/1988 | Hrovat et al. | 74/851 X |
| 4,800,781 | 1/1989 | Yasue et al. | 74/872 X |
| 4,855,913 | 8/1989 | Brekkestran et al. | 74/866 X |
| 4,868,753 | 9/1989 | Mori | 74/866 X |
| 4,871,048 | 10/1989 | Chatterjea | 192/109 F X |
| 4,949,264 | 8/1990 | Katayama et al. | 74/867 X |
| 4,982,622 | 1/1991 | Yamamoto et al. | 74/866 |
| 4,989,477 | 2/1991 | Hunter et al. | 74/867 X |
| 5,046,383 | 9/1991 | Butts et al. | 74/866 X |

Primary Examiner—Leslie A. Bran
Assistant Examiner—David E. Henn
Attorney, Agent, or Firm—Roger L. May; Frank G. McKenzie

[57] ABSTRACT

To reduce shift bump and increase smoothness during shifts, pressure into an on-coming clutch of an automatic transmission is electronically controlled using a turbine speed adaptive strategy. Because of the change in engine speed that accompanies this torque flow path transition, such shifts include a torque phase and an inertia phase. To make the shift smooth, the torque phase is completed quickly by boosting pressure at the beginning of the shift. Just before the torque phase is commmpleted, the pressure is lowered so the inertia phase bump is reduced. The end of the torque phase is predicted by monitoring the turbine speed rise since the start of the shift and comparing it with a value which is derived from an adaptive table. During the inertia phase, the pressure is ramped up to complete the shift quickly and smoothly. Ignition spark timing is reduced in the inertia phase to further improve shift feel.

14 Claims, 7 Drawing Sheets

METHOD AND SYSTEM FOR IMPROVING SMOOTHNESS OF SHIFTS IN AN AUTOMATIC TRANSMISSION

TECHNICAL FIELD

This invention relates to methods and systems for controlling automatic transmissions and, in particular, to methods and systems for electrically controlling automatic transmissions to improve smoothness of shifts.

BACKGROUND ART

Two phases typically occur during an upshift of an automatic transmission of an automatic vehicle drive line, namely, a torque phase and an inertia phase. Before the upshift is commanded, the torque input to the transmission clutches includes only the engine combustion torque passing through a torque converter. During the torque transfer phase, pressure is applied to the incoming clutch element. The input torque is split between the outgoing clutch and the incoming clutch. By the end of the torque phase, the torque carried by the outgoing clutch drops to zero and all the torque is carried by the incoming clutch element. The output torque is reduced because of the change in gear ratio.

After the torque transfer is completed, the ratio transfer phase or the inertia phase begins. During this phase, as the pressure on the oncoming element increases further, the engine speed is reduced rapidly to the level of the new gear ratio. This creates a large inertia torque which has to be absorbed in addition to the combustion torque by the clutch element. This inertia torque creates a torque bump which is transmitted to the passenger compartment. The magnitude of the torque bump is dependent on the clutch pressure at the start of the inertia phase.

One method of reducing the inertia bump is to reduce the pressure to the clutch during the shift. However, this lengthens the shift time (torque phase and the inertia phase) and, consequently, the shift feels dragged out. Also, a large amount of heat is created which has to be absorbed by the clutches.

A number of U.S. patents disclose shift shock minimizing systems which control the line pressure supplied to the on-coming transmission friction element. For example, the U.S. patent to Ishimaru et al., U.S. Pat. No. 3,855,880 discloses a system which reduces line pressure to the on-coming transmission friction element just prior to engagement of that element in order to provide a smooth coupling.

In the U.S. patent to Burkel et al., U.S. Pat. No. 4,611,507, turbine speed is sensed and inputted into an ECU. This sensed speed signal is used to determine the engagement pressure supplied to the on-coming transmission friction element.

Other U.S. patents discuss the torque and inertia phases associated with shifts. For example, the U.S. patents to Downs et al., U.S. Pat. Nos. 4,653,350 and 4,707,789 disclose how output torque is developed during a shifting operation. FIG. 2B of each of these patents represents the pressure supplied to the on-coming clutch during the shifting operation. In both of these patents, the pressure to the on-coming clutch is initially boosted during a fill phase, reduced during a torque phase and ramped during an inertia phase.

U.S. Pat. No. 4,845,618 issued to Narita discloses a system for controlling clutch pressure during a shift. The clutch pressure is maintained at a stored target value that is called out as a result of the monitoring of turbine torque. The line pressure supplied to the oncoming clutch is determined based on sensed engine output and torque converter output speeds.

A number of U.S. patents disclose control systems for minimizing shocks during shifting operations in transmissions wherein the engine spark timing is adjusted in order to reduce output torque during the shifts.

For example, in the U.S. patent to Mori U.S. Pat. No. 4,680,988, the engine spark timing is employed to reduce output torque during shifting. The supply pressure to the on-coming transmission friction element during the shift is dependent upon a sensed ratio of input-to-output speed of the transmission The '988 patent further describes a closed loop control for a clutch during a shift using a continuous monitoring of speed ratio across the clutch.

In the U.S. patent to Takeda et al., U.S. Pat. No. 4,744,031, the ignition timing is retarded to reduce output engine torque after a specified time delay from the occurrence of a shift command and prior to unlocking of the torque converter.

In the U.S. patent to Hrouat et al., U.S. Pat. No. 4,792,902, there is disclosed a system which controls the ignition timing of an internal combustion engine in accordance with the magnitude of engine speed and transmission output speed. The spark timing is altered as a function of the inertia torque.

Finally, in the U.S. patent to Yasue et al., U.S. Pat. No. 4,800,781, spark ignition timing is retarded prior to shifting and the fuel supplied to the internal combustion engine is increased immediately after the shifting operation.

SUMMARY OF THE INVENTION

An object of the present invention is to provide a method and system for improving smoothness of shifts in an automatic transmission wherein the shifting includes a torque phase and an inertia phase and wherein control of the shift is provided by continuously monitoring turbine speed and comparing a turbine speed change at the end of the torque phase with a stored value. Preferably, the control is augmented by retarding engine spark for a controlled time.

Another object of the present invention is to provide a method and system for improving smoothness of shifting in an automatic transmission wherein the shifting includes a torque phase and an inertia phase and wherein line pressure to an oncoming transmission clutch of the transmission is (1) boosted during the initial torque phase of the shift, (2) then quickly reduced, and (3) ramped during the inertia phase and wherein engine spark timing is retarded during the shifting operation.

In carrying out the above objects and other objects of the present invention in an automotive vehicle driveline comprising a multiple speed ratio automatic transmission having a frictional element associated with a specified speed ratio, an internal combustion engine, a torque input shaft for coupling the engine and the transmission, and a fluid pressure control system including fluid pressure generating means for generating a fluid pressure, a method is provided for increasing shift smoothness when shifting from a currently engaged speed ratio to the specified speed ratio. The shift includes a torque phase and an inertia phase. The control system further includes control means for controlling the fluid pressure generating means such that the level of the fluid pressure generated by the fluid pressure generating means is supplied to the frictional element during the torque and inertia phases in accordance with a pressure schedule to initiate and progressively increase the torque transmission therethrough. The method includes the steps of generating a speed signal based on the instantaneous speed of the input shaft during the torque and inertia phases and generating a shift signal to indicate the desired shift from the currently engaged speed ratio to the specified speed ratio. The value of the speed signal changes during the torque and inertia phases. The method further includes the steps of correlating the shift signal to the pressure schedule so that the level of fluid pressure controlled by the control means increases at the start of the torque phase to quickly complete the torque phase and correlating the speed signal to the pressure schedule so that the level of fluid pressure controlled by the control means decreases immediately before the completion of the torque phase to reduce the torque bump in the inertia stage.

A system for increasing shift smoothness is also provided for carrying out the above method steps.

Further, in carrying out the above objects and other objects of the present invention, an adaptive control system is provided for regulating pressure in a friction torque establishing device for an automotive vehicle driveline having an internal combustion engine and multiple ratio transmission gearing. The system includes a torque input shaft between the engine and the gearing, a first friction mechanism adapted to establish in part a first torque flow path between the input shaft and first torque input gear elements of said gearing and a second friction mechanism adapted to establish in part a second torque flow path between the input shaft and second torque input gear elements. The system further includes first and second pressure operated servos which, when pressurized, to energize the first and second friction mechanisms, respectively, the establishment of the second torque flow path being accompanied by a decreased engine speed, means for continuously monitoring the speed of the torque input shaft and means for increasing the pressure of the second servo upon a command of a shift in gearing ratio that requires release of the first friction mechanism and application of the second friction mechanism. Finally, the system includes means for decreasing the servo pressure in response to a predetermined detected change in torque input shaft speed and means for increasing the servo pressure following a decrease in the clutching capacity of the first friction mechanism during the ratio shift.

Preferably, the method and system also include the feature of retarding engine spark for a controlled time during the inertia phase to further improve shift quality.

The above advantages and other advantages and features of the present invention are readily apparent from the following detailed description of the invention when taken in connection with the accompanying drawings.

BEST MODE FOR CARRYING OUT THE INVENTION

Figure 1:
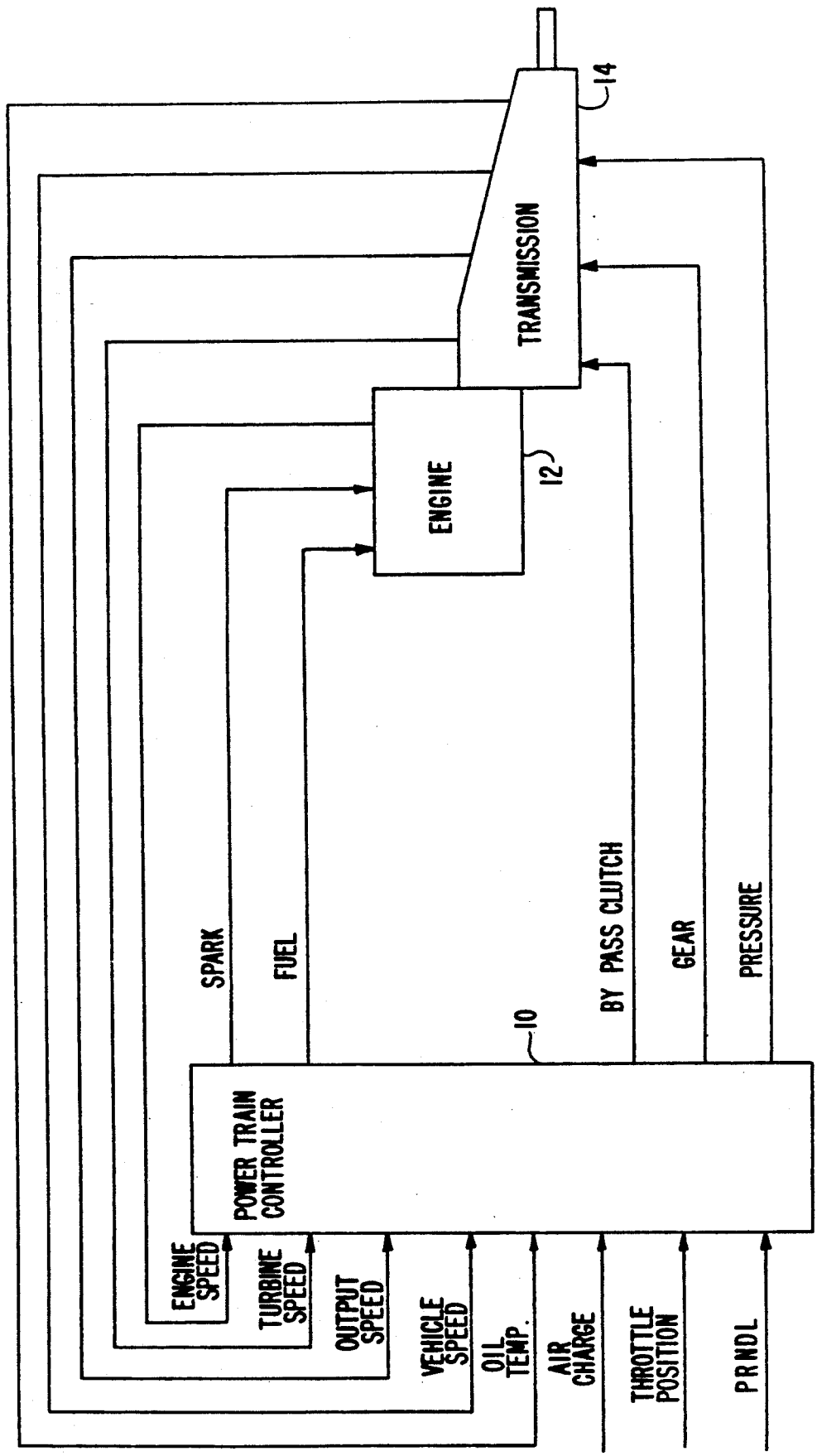
FIG. 1 is a general block diagram illustrating the method and system of the present invention wherein shift smoothness is improved.

Referring now to the drawing figures, there is generally illustrated in FIG. 1 a power train controller or microprocessor 10 which controls a vehicle engine 12 and a transmission 14 coupled thereto. The controller 10 receives input signals from various sensors which measure engine, transmission and other vehicle operating conditions. Details of the system of FIG. 1 are more fully disclosed in co-pending patent application Ser. No. 383,506, filed Jul. 24, 1989 and entitled "Electronic Control System For Controlling Torque Converter Bypass Clutches" now U.S. Pat. No. 5,029,087. This application has the same assignee as the present invention and is hereby incorporated by reference in its entirety.

One output of the controller 10 is transferred to a bypass clutch pulse width modulated solenoid. The solenoid valve controlled by the pulse width modulated solenoid modulates the pressure in a solenoid feed pressure passage and delivers a control signal to the bypass clutch control valve. The clutch control valve is calibrated to receive the control pressure of the solenoid output to establish in a control chamber a pressure that will determine the controlled slip of the bypass clutch which couples engine torque to the transmission 14.

Figure 2:
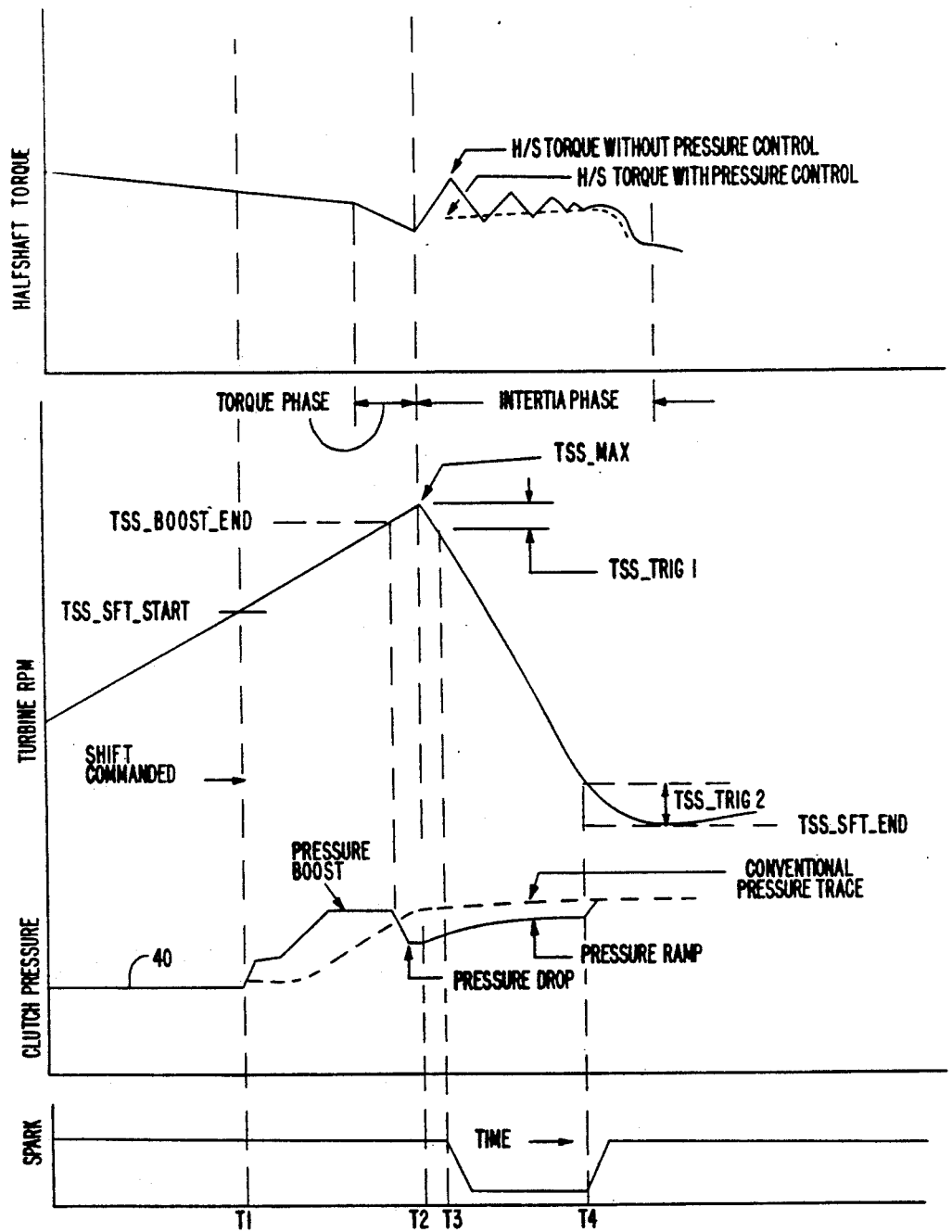
FIG. 2 illustrates graphs of halfshaft torque, turbine RPM, clutch pressure and spark against a common time base divided into torque and inertia phases of a shift.

FIG. 2 of the co-pending application noted above shows in schematic form the architecture of the controller 10 as well as the relationship of the controller 10 to the hydraulic control valve body and to the transmission clutches and brakes. FIG. 2 also shows the schematic arrangement of the various sensors with respect to the processor and the hydraulic control valve body.

The sensors, together with transducers not specifically illustrated in FIG. 1, convert physical signals to electrical signals. Physical signals include throttle position or engine manifold pressure (i.e. air charge), engine speed (transmission turbine speed), and transmission gear ratio selection as well as other variables such as transmission oil temperature, vehicle speed and the vehicle brake condition. The controller 10 inputs these signals and operates on them according to a control program or a strategy as discussed below and then outputs the results to certain actuators which function in cooperation with the hydraulic valve body to control the transmission 14.

The controller 10 includes a central processing unit or CPU which comprises a computation unit and a control unit. An internal control bus establishes a relationship between memory unit and the processing unit. Other internal busses establish a relationship between the CPU and an input conditioning signal circuit and an output driver circuit.

The CPU executes programs that are fetched from memory and provide the timing and controlled values of the output signals to the hydraulic control valve body of the transmission. The input signal conditioning and the output driver system allow the controller 10 to read and write data under program control.

The memory portion of the controller 10 stores programs and data and provides data to the controller 10 as well as accepting new data from the CPU for storage.

The memory portion of the controller 10 of FIG. 1 includes two types of memory; first, a read only memory or ROM which stores information or data that is read by the processor in each background loop and, second, a random access memory or RAM which holds or temporarily stores the results of the computations of the CPU as well as other data. The contents of the RAM can be erased, rewritten or changed depending upon the operating conditions of the vehicle.

The two types of memory are located in an integrated circuit in the form of a microprocessor chip whereas the computations performed by the CPU are the result of the function of a second integrated circuit comprising a separate microprocessor chip, the two chips being connected by an internal bus and interface circuitry.

One of the input signals to the controller 10 is a throttle position signal which is generated by a position sensor. An engine speed sensor, preferably in the form of a profile and condition pickup (PIP), delivers an engine speed signal along another line to the controller 10. A transmission oil sensor delivers an oil temperature signal along a line to the controller 10. Preferably, a barometric pressure sensor also delivers an altitude signal to the controller 10.

Reference may be made to U.S. Pat. Nos. 4,633,738 and 4,665,770 for a particular description of the torque converter, transmission system and transmission clutches that may be controlled by the control system described in this specification.

A vehicle speed sensor measures or senses the speed of the driven element of the transmission 11 which is an indicator of the vehicle speed. That signal is delivered through a line to the controller 10.

The drive range for the transmission 14 is selected by the vehicle operator by manual adjustment of a selector lever. The various ranges are reverse, neutral, drive (D), direct drive ratio and low speed ratio (1). Various shift patterns are established for the three forward drive ranges D, 3, and 1, depending upon the position that is selected by the vehicle operator. The position that is selected is sensed by a sensor and a position signal delivered through a line to the controller 10.

The controller 10 also preferably includes a sub-system identified as loss-of-signal-hardware (LOS). This hardware is adapted to establish an appropriate control signal for the output driver circuit that will cause the hydraulic valve body to continue operating with limited function in the event of an electronic voltage failure in the system.

Referring now to FIG. 2, there is illustrated a clutch pressure trace for smooth upshifts by solid line 40. Preferably, the pressure trace is continuously computed based on engine speed and air charge. The strategy makes the upshifts smooth by varying the clutch pressure during the shift. This is done by boosting the pressure to a high value at the start of the shift and through part of the torque phase, then lowering it just before the inertia phase starts. It is important to drop the pressure at the right moment since if the pressure is lowered too soon, then the torque phase will be dragged out. If the pressure is dropped too late, the inertia phase will begin with high clutch pressure and the shift will feel very firm. Preferably, the pressure drop is completed approximately 100 ms before T2, the start of the inertia phase.

The moment to drop pressure is decided by the turbine rpm rise since the start of the shift. RPM rise is affected by the friction properties of the on-coming clutch which change with temperature and time. Therefore, temperature compensation is provided as well as adaptive compensation based on previous shift experience.

In other words, the line pressure supplied to the on-coming transmission clutch is controlled using a turbine speed adaptive strategy. The adaptive strategy utilizes the fact that each upshift comprises the torque phase and the inertia phase. During the torque phase, which occurs at the beginning of the upshift, line pressure is boosted in order that the torque phase may be completed quickly. Just prior to the completion of the torque phase, the line pressure is reduced so that as the shift carries into the inertia phase, any associated shift shocks will be reduced. In order to determine the end of the torque phase and the beginning of the inertia phase, the turbine speed is sensed from the start of the shifting operation. The rise in turbine speed associated with the shift is compared with a value which is derived from an adaptive table. The values stored in the adaptive table are based on previous shift experience with modifications made for at least temperature changes.

Figure 3:
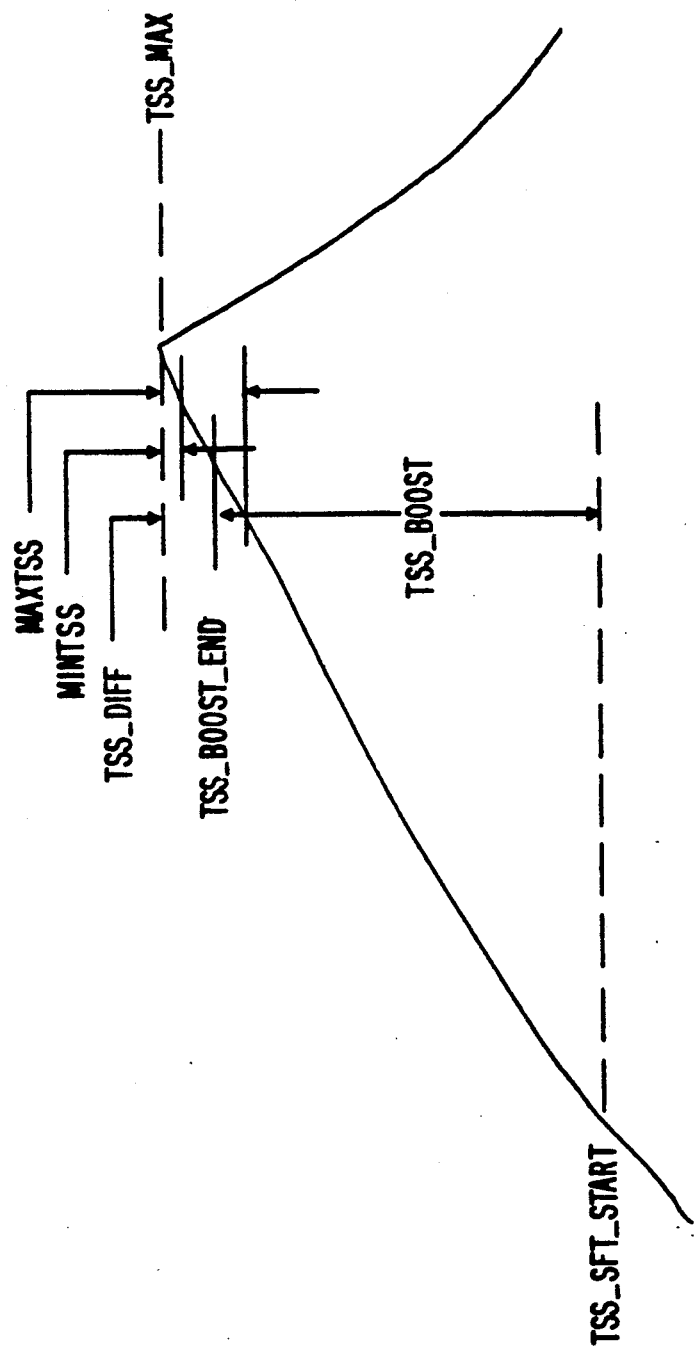
FIG. 3 is a graph illustrating the details of the turbine shift strategy of the present invention.

Referring now to FIG. 3 in combination with FIGS. 4-7, there is illustrated the details of the turbine speed strategy. As long as the pressure drop occurs at rpm between constants MINTSS (minimum turbine shift speed) and MAXTSS (maximum turbine shift speed), the shift will be smooth. Typically, MINTSS and MAXTSS are initially determined empirically for a particular automatic transmission. After every shift, the maximum rpm reached and TSS_DIFF are calculated. If TSS_DIFF is out of the range MINTSS and MAXTSS, the adaptive table cell for that throttle position, starting turbine speed and transmission oil temperature are adjusted. Also, spark retard is commenced when TSS_DIFF reaches or exceeds MAXTSS. This is done to expedite the end of torque phase by reducing engine torque input to the clutch. Typical values for TSS_SFT_Start and TSS_Boost_END are 5,000 rpm and 5,600 rpm, respectively.

In other words, after the torque phase is completed and the inertia phase begins, the line pressure delivered to the on-coming transmission clutch is ramped up to complete the shift smoothly and quickly. Ignition spark timing may also be reduced during this inertia phase in order to further improve shift feel.

Figure 4:
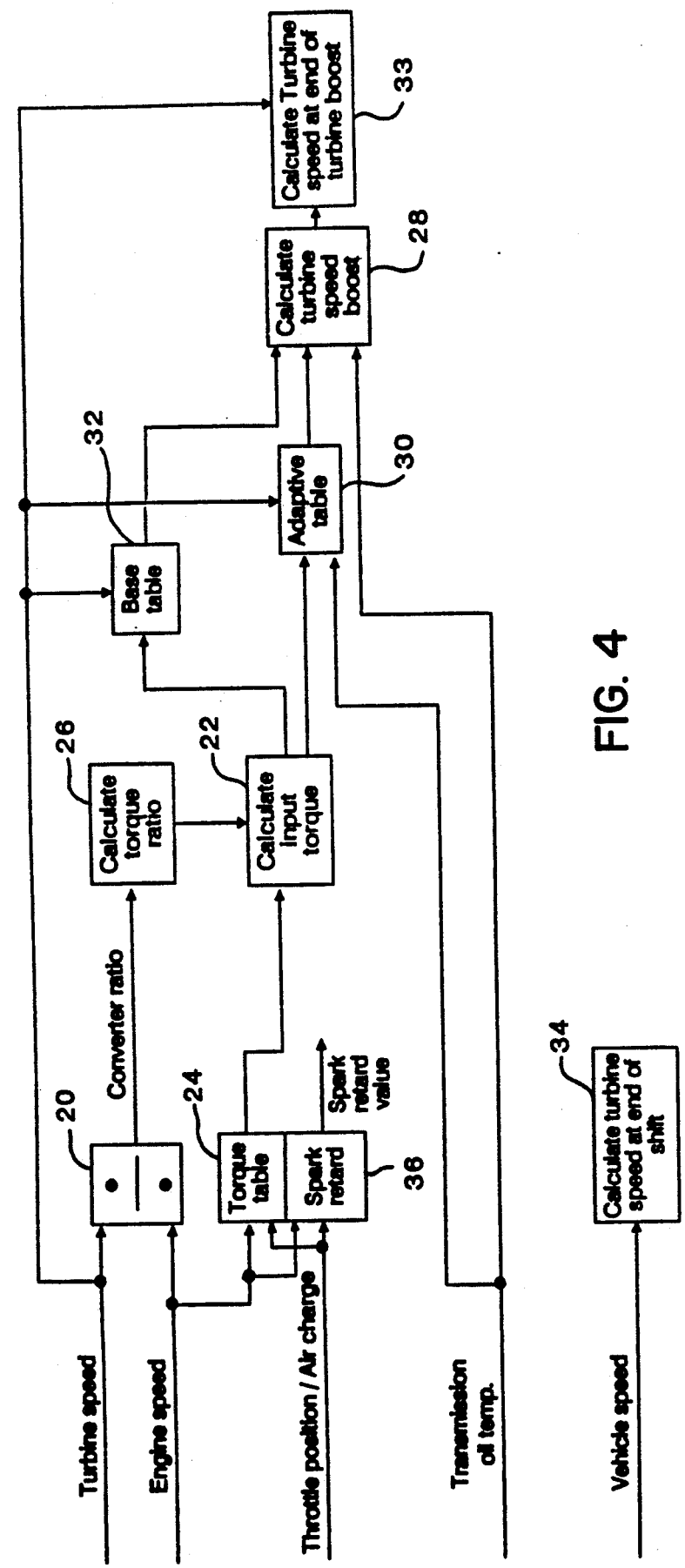
FIG. 4 is a detailed block diagram illustrating the method and system of the present invention.

Referring now to FIG. 4, there is illustrated in block diagram form the upshift smoothness strategy which is performed in background when a shift is commanded. Initially, turbine speed at the beginning of the shift is recorded (TSS_SFT_Start). Also, the engine speed at the start of the shift is recorded (NE_Start). These speeds are determined after an upshift is commanded as indicated at block 18 of FIG. 6.

Then, as indicated in block 20, a converter ratio is calculated by dividing starting turbine speed by the starting engine speed (TQ_Ratio). Torque ratio (TQ_RATIO) is calculated from the converter ratio at block 26. Then the transmission oil temperature (TOT) and the throttle position at the start of the shift (TP_Start)

are recorded. Input torque is calculated as indicated by block 22 (TQ_Input_Start) from a torque table input value from block 24 which, in turn, is obtained based on inputs of throttle position and the engine speed at the start of the shift and the torque ratio value from block 26.

Then, the turbine speed rise (TSS-Boost) during which the hydraulic pressure is to be boosted is calculated as indicated at block 28. Inputs to block 28 include a transmission oil temperature signal, an adaptive table signal represented by block 30 and a base table signal represented by block 32. The turbine speed boost combines the base table signal from block 32 which has inputs of turbine speed and input torque from block 22. The adaptive table signal contains information regarding a previous similar shift and has inputs from the input torque block 22 and transmission oil temperature.

After the turbine speed boost as indicated by block 28 has been calculated, the turbine speed is calculated at the end of the turbine boost as indicated by block 30 wherein the turbine speed boost is added to the turbine speed at the beginning of the shift.

Figure 6:
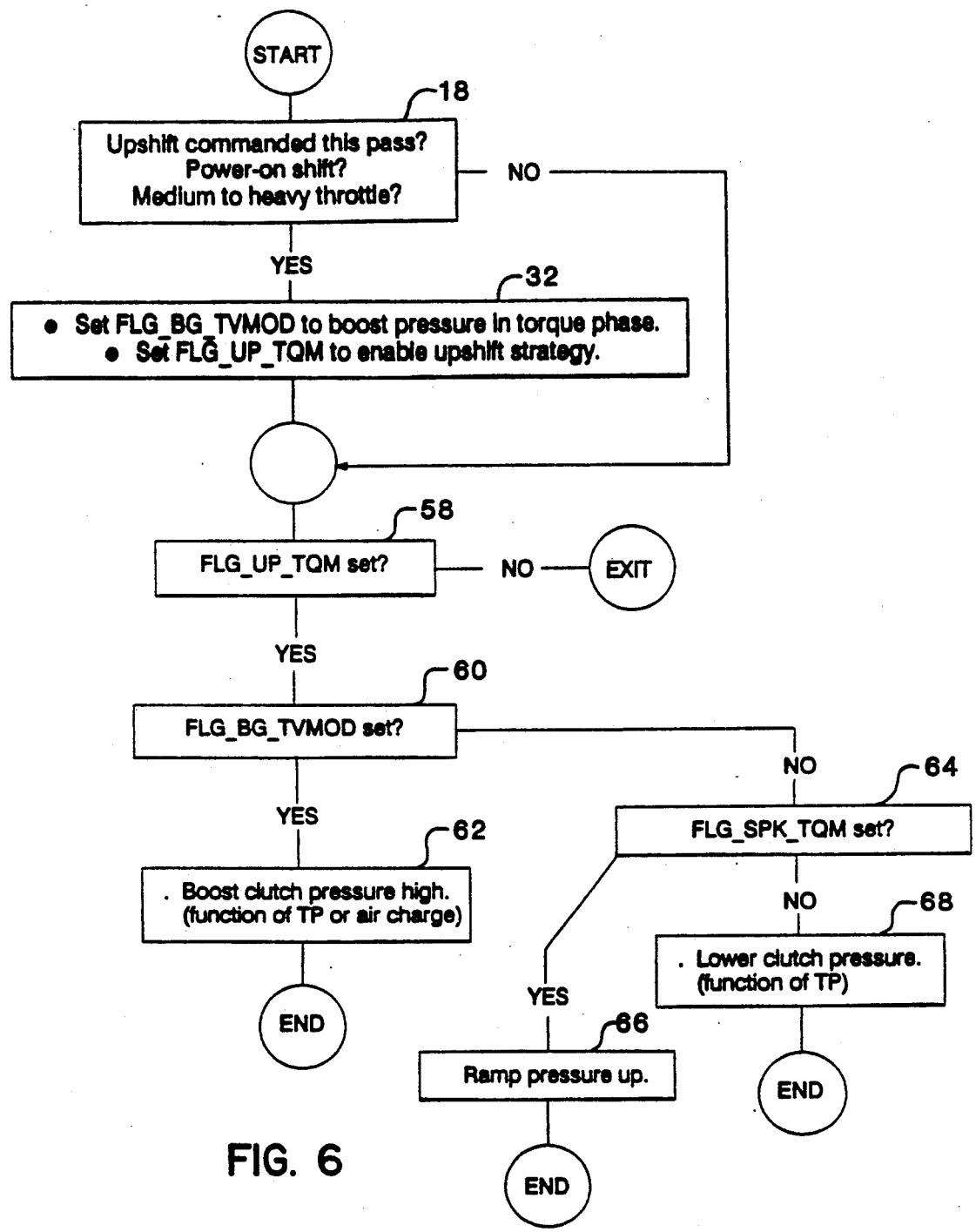
FIG. 6 is a flow diagram illustrating the logic of the present invention executed in the background to ensure shift smoothness.

As indicated by block 32 in FIG. 6, a first flag is set to boost pressure in the torque phase, and a second flag is set to enable the shift strategy.

Referring again to FIG. 4, the turbine speed at the end of the shift (TSS_SFT_END) is calculated from vehicle speed as indicated at block 34.

Finally, a spark retard value is calculated from a spark retard table indicated at block 36 from engine speed and throttle position or air charge.

Figure 5:
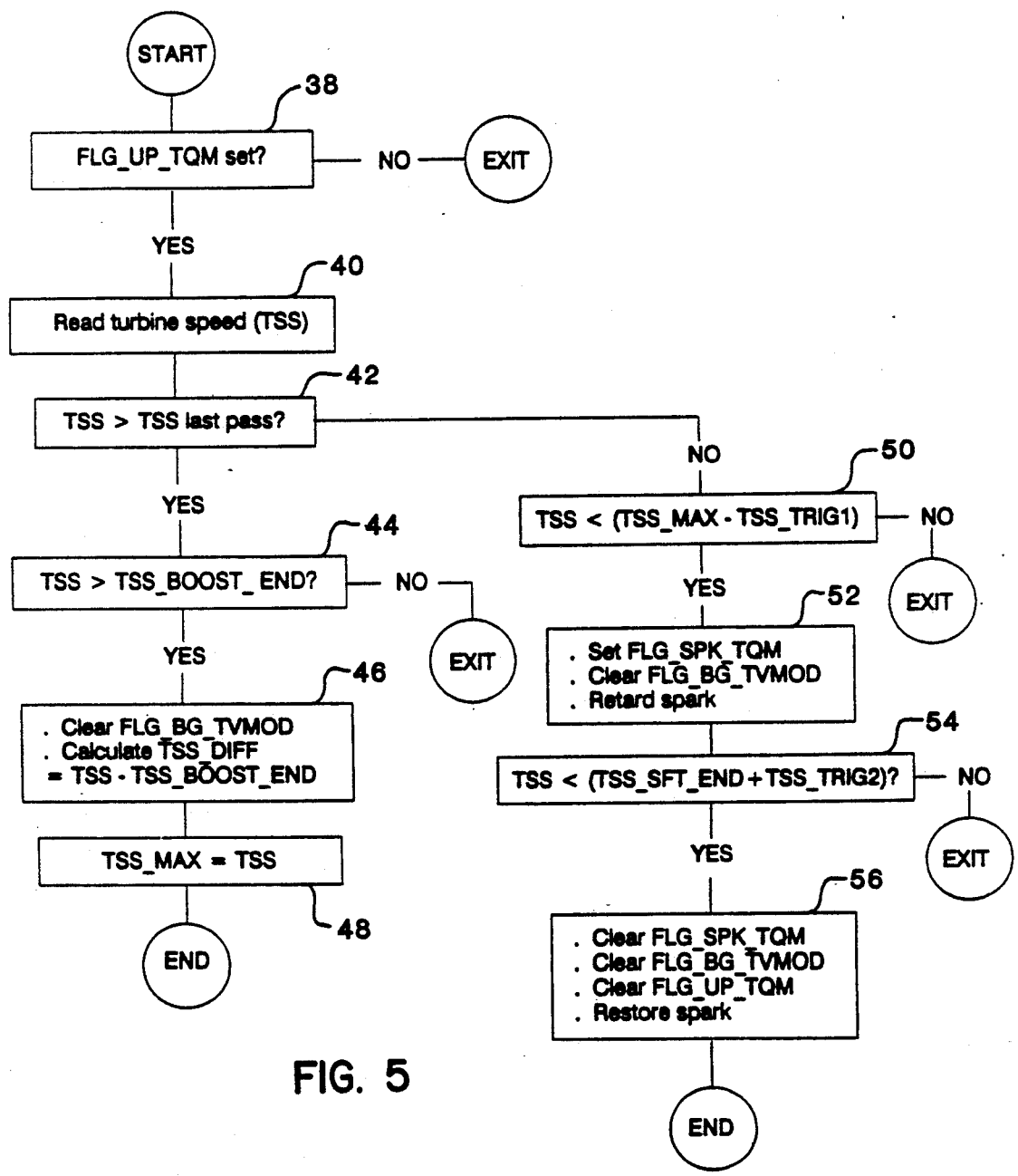
FIG. 5 is a flow diagram illustrating the logic of the present invention executed in foreground once every turbine speed interrupt.

Referring now to FIG. 5, there is illustrated the logic which is executed in foreground once for every turbine speed interrupt.

At block 38, the shift strategy flag is tested.

At block 40, the turbine speed signal is read.

At block 42, the present turbine speed is tested with the turbine speed existing in the last pass through the phase determination logic.

The present turbine speed is tested against the turbine speed occurring at the end of the turbine boost at block 44 if the present turbine speed is greater than the previous turbine speed.

At block 46, (if the turbine speed is greater than the turbine speed at the end of the boost), the boost flag is cleared and a difference turbine speed is calculated from the current turbine speed minus the turbine speed at the end of the boost. The maximum turbine speed is determined at block 48.

If the present turbine speed is less than or equal to the previous turbine speed, block 50 is entered from block 42. At block 50, it is determined whether the present turbine speed is less than the previously determined maximum turbine speed minus the turbine speed occurring at time T3 as shown in FIG. 2.

If the turbine speed is less than this value, then the inertia phase flag is set and the boost phase flag is cleared and the spark is retarded as indicated at block 52.

At block 54, if the present turbine speed is less than the turbine speed at the end of the shift, added to the turbine speed at time T4, as indicated in FIG. 2, then the inertia flag is cleared, the boost phase flag is cleared, the shift strategy flag is cleared and the spark is restored as indicated at block 56.

Referring again to FIG. 6 at block 58, a torque and inertia phase pressure strategy is entered within the general upshift pressure strategy If the shift strategy flag is set as determined by block 58, then the boost phase flag is checked at 60. If the boost phase flag is set, then the clutch pressure is boosted high which is a function of throttle position or air charge as indicated at block 62. If the boost phase flag is not set as tested for at block 60, then the inertia phase flag is checked at block 64. If this flag is set, then the pressure is ramped up as indicated at block 66. If this flag is not set, then the clutch pressure is lowered also as a function of throttle position or air charge.

Figure 7:
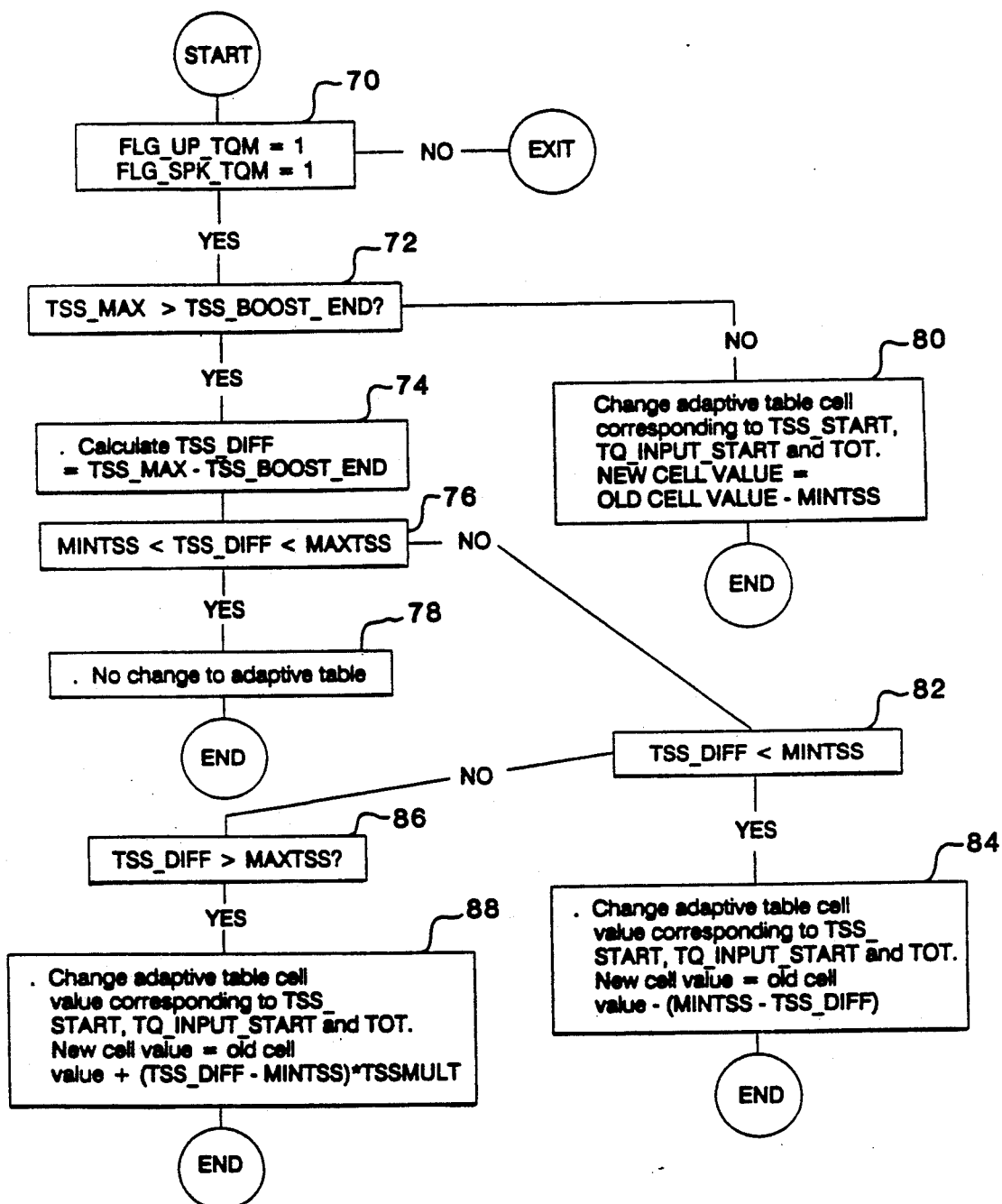
FIG. 7 is a flow diagram illustrating the logic of the present invention executed in the background to update an adaptive table.

Referring now to FIG. 7, there is indicated adaptive table update logic which is executed once every background loop of the system.

Initially, as indicated at block 70, the shift strategy flag and the inertia phase flag are tested. If both flags are set, then the maximum turbine speed is tested to see if it is greater than the turbine speed at the end of the boost as indicated at block 72.

If the maximum turbine speed is greater than the turbine speed at the end of the boost, then a turbine differential speed is calculated as the difference between the maximum turbine speed and the turbine speed at the end of the boost as indicated at block 74.

As indicated at block 76, this turbine differential speed signal is tested to see if it is between the minimum and maximum turbine speeds. If this difference signal is between the minimum and maximum, no change is made to the adaptive table 30 as indicated in FIG. 4 and as indicated at block 78.

At block 80, if the maximum turbine speed is less than or equal to the turbine speed at the end of the boost, the adaptive table cell corresponding to the beginning turbine speed, transmission oil temperature and the starting input torque is changed at block 80. The new cell value equals the old cell value minus the minimum turbine speed.

At block 82, if the difference in turbine speed is less than the minimum turbine speed as tested for at block 82, then at block 84, the adaptive table cell is changed to a value corresponding to the starting turbine speed, the transmission oil temperature and the starting input torque. The new cell value is calculated as the difference between the old cell value and the difference between the minimum turbine speed and the difference in turbine speed previously calculated.

If the difference in turbine speed is greater than the maximum turbine speed as indicated at block 86, then the adaptive table cell is changed to a value also corresponding to the starting turbine speed, the starting input torque and the transmission oil temperature wherein the new cell value is calculated from the old cell value and the result from the multiplication of the difference between the minimum turbine speed and the difference in turbine speed multiplied by a turbine speed multiplier factor as indicated at block 88. In this way, the control is adaptive and learns from prior shifts.

The advantages occurring to the method and system of the present invention are numerous. For example, the method and system reduces shift bump and increases smoothness during upshifts During the inertia phase, the pressure is ramped up to complete the shift quickly and smoothly. Also to improve shift feel, engine spark timing is reduced in the inertia phase.

While the best mode for carrying out the invention has been described in detail, those familiar with the art to which this invention relates will recognize alternative designs and embodiments for practicing the invention as defined by the following claims.

We claim:

1. In an automatic vehicle driveline comprising a multiple speed ratio automatic transmission having a frictional element associated with a specified speed ratio, an internal combustion engine, a torque input shaft for coupling the engine and the transmission, and a fluid pressure control system including fluid pressure generating means for generating a fluid pressure, a method for increasing shift smoothness when shifting from a currently engaged speed ratio of the specified speed ratio, the shift includes a torque phase and an inertia phase, the control system further including control means for controlling the fluid pressure generating means such that the level of the fluid pressure generated by the fluid pressure generating means is supplied to the frictional element during the torque the inertia phases in accordance with a pressure schedule to initiate and progressively increase the torque transmission therethrough, the method comprising the steps of:
   generating a speed signal based on the instantaneous speed of the input shaft during the torque and inertia phases, the value of the speed signal changing during the torque and inertia phases;
   generating a shift signal to indicate a desired shift from the currently engaged speed ratio to the specified speed ratio;
   correlating the shift signal to the pressure schedule so that the level of fluid pressure controlled by the control means increases at the start to of the torque phase to quickly complete the torque phase;
   correlating the speed signal of the pressure schedule so that the level of fluid pressure controlled by the control means decreases immediately before the completion of the torque phase and to reduce the torque bump in the inertia phase; and
   estimating the completion of the torque phase wherein the step of estimating includes the steps of comparing the change in the speed signal with a predetermined value of the speed signal during the torque phase.

2. The method as claimed in claim 1 wherein the predetermined value of the speed signal is based on a prior shift.

3. The method as claimed in claim 2 wherein the level of fluid pressure controlled by the control means decreases when the speed signal is in a predetermined range defined by a predetermined minimum value and a predetermined maximum value.

4. The method as claimed in claim 3 further comprising the step of determining the maximum value of the speed signal during the prior shift.

5. The method as claimed in claim 4 further comprising the step of calculating the difference between the maximum value of the speed signal and the value of the signal speed immediately prior to the decrease in fluid pressure controlled by the control means to obtain a difference signal.

6. The method as claimed in claim 5 further comprising the step of determining if the value of the difference signal is in the predetermined range.

7. The method as claimed in claim 6 wherein a set of predetermined value is defined by a data matrix of throttle position, speed of the shaft at the beginning of the shift and transmission oil temperature, and wherein the method further comprises the step of modifying the predetermined value of the prior shift when the value of the difference signal is outside the predetermined range.

8. The method as claimed in claim 6 further comprising the step of reducing engine torque to the transmission when the difference signal is greater than or equal to the predetermined maximum value to expedite the end of the torque phase.

9. The method of claim 8 wherein the step of reducing includes the step of retarding the ignition spark timing of the engine.

10. The method as claimed in claim 1 wherein the fluid pressure controlled by the control means is ramped up after completion of the torque phase to complete the shift smoothly and quickly.

11. The method as claimed in one of claims 1 and 10 further comprising the step of retarding ignition spark timing of the engine during the inertia phase to improve shift feel.

12. In an automotive vehicle driveline comprising a multiple speed ratio automatic transmission having a frictional element associated with a specified speed ratio, an internal combustion engine, a torque input shaft for coupling the engine and the transmission, and a fluid pressure control system including fluid pressure generating means for generating a fluid pressure, a system for increasing shift smoothness when shifting from a currently engages speed ratio to the specified speed ratio, the shifting including a torque phase and an inertia phase, the control system further including control means for controlling the fluid pressure generating means such that the level of the fluid pressure generated by the fluid pressure generating means is supplied to the frictional element during the torque and inertia phases in accordance with a pressure schedule to initiate and progressively increase the torque transmission therethrough, the system comprising:
   means for generating a speed signal based on the instantaneous speed of the input shaft during the torque and inertia phases, the value of the speed signal changing during the torque and inertia phases;
   means for generating a shift signal to indicate the desired shift from the currently engaged speed ratio to the specified speed ratio;
   means for correlating the shift signal to the pressure schedule so that the level of fluid pressure controlled by the control means increases at the start of the torque phase to quickly complete the torque phase;
   means for correlating the speed signal to the pressure schedule so that the level of fluid pressure controlled by the control means decreases immediately before the completion of the torque phase to reduce the torque pump in the inertia stage; and
   means for estimating the completion of the torque phase, wherein said means for estimating includes means for comparing the change in the speed signal with a predetermined value of the speed signal during the torque phase.

13. The system as claimed in claim 12 wherein the fluid pressure controlled by the control means is ramped up after completion of the torque phase to complete the shift smoothly and quickly.

14. The system as claimed in claim 12 or claim 13 further comprising means for retarding ignition spark timing of the engine during the inertia phase to improve shift feel.

* * * * *

UNITED STATES PATENT AND TRADEMARK OFFICE
CERTIFICATE OF CORRECTION

PATENT NO. : 5,188,005

DATED : February 23, 1993

INVENTOR(S) : Bal G. Sankpal and John F. Carnago

It is certified that error appears in the above-identified patent and that said Letters Patent is hereby corrected as shown below:

On the title page: Item [75]
delete "Bak G. Sankpal" and substitute --Bal G. Sankpal--.

Abstract, line 10, "commpleted" should be --completed--.

Column 2, line 16, after "transmission" insert a period (.).

Column 6, line 62, after "FIG" delete the comma (,) and insert a period (.).

Column 7, line 68, after "strategy" (first occurrence) insert a period (.).

Column 8, line 60, after "upshifts" insert a period (.).

Column 9, line 9, claim 1, delete "of" and insert --to--.

Column 9, line 15, claim 1, after "torque" delete "the" and insert --and--.

UNITED STATES PATENT AND TRADEMARK OFFICE
CERTIFICATE OF CORRECTION

PATENT NO. : 5,188,005

DATED : February 23, 1993

INVENTOR(S) : Bal G. Sankpal and John F. Carnago

It is certified that error appears in the above-identified patent and that said Letters Patent is hereby corrected as shown below:

Column 9, line 28, claim 1, delete "steps" and insert --step--.

Column 9, line 54, claim 5, delete "signal speed" and insert --speed signal--.

Column 10, line 25, claim 12, delete "engages" and insert --engaged--.

Column 10, line 52, claim 12, delete "pump" and insert --bump--.

Signed and Sealed this

Twenty-eighth Day of December, 1993

*Attest:*

BRUCE LEHMAN

*Attesting Officer*  *Commissioner of Patents and Trademarks*